Nov. 6, 1934.                G. H. ELLIS                1,979,373
                    APPARATUS FOR DEFIBERIZING WOOD
                       Filed May 31, 1930        7 Sheets-Sheet 4
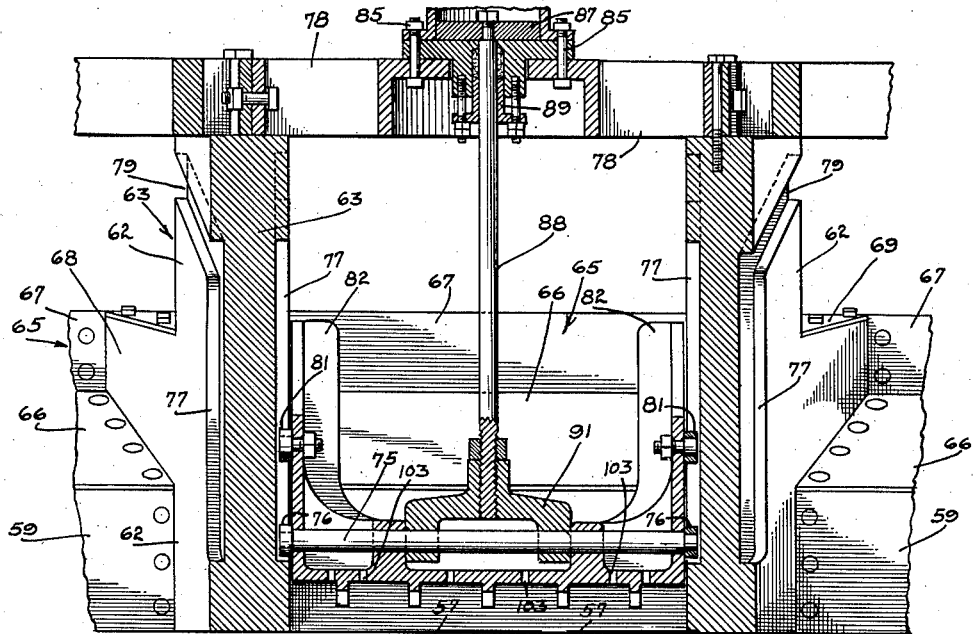
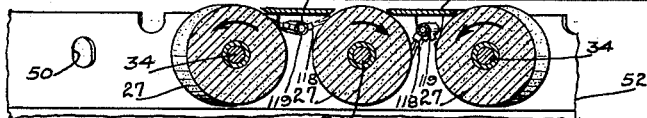
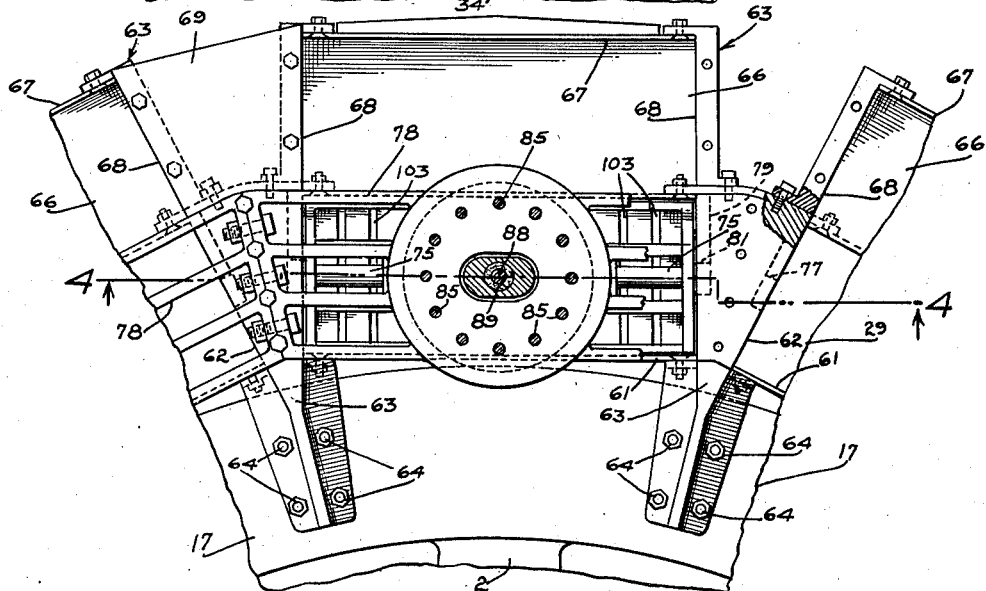
Fig.4
Fig.5
INVENTOR
GEORGE H. ELLIS
By Paul, Paul & Moore
ATTORNEYS

INVENTOR
GEORGE H. ELLIS
ATTORNEYS

Nov. 6, 1934.   G. H. ELLIS   1,979,373
APPARATUS FOR DEFIBERIZING WOOD
Filed May 31, 1930   7 Sheets-Sheet 6

INVENTOR
GEORGE H. ELLIS
ATTORNEYS

Patented Nov. 6, 1934

1,979,373

UNITED STATES PATENT OFFICE 1,979,373

APPARATUS FOR DEFIBERIZING WOOD

George H. Ellis, St. Paul, Minn., assignor to The Insulite Company, Minneapolis, Minn., a corporation of Minnesota Application May 31, 1930, Serial No. 458,247

12 Claims. (Cl. 83—75)

This invention relates to an improved apparatus for defiberizing wood, and an object of the invention is to provide such an apparatus adapted to separate the fibers of wood without grinding, whereby the fibers will be comparatively long and thread-like. The apparatus is an improvement over the form shown in my pending application, Serial No. 376,824, filed July 8, 1929.

A further object is to provide an apparatus for defiberizing wood comprising a series of abrasive elements over which the wood is fed lengthwise of the fibers, and each of said elements being provided with an independent drive.

A further object is to provide an apparatus including a spider mounted for rotary movement and provided at its periphery with a plurality of main hoppers each provided with a fluid-operated plunger adapted to force the wood pieces downwardly in the hopper against the surfaces of the abrasive elements, and each main hopper having an auxiliary hopper communicating therewith into which the wood pieces may be delivered while the plunger is in an operative position within the main hopper, a portion of each plunger functioning as a wall for one side of the auxiliary hopper to prevent the wood pieces contained therein from being delivered into the main hopper connected therewith while the plunger is exerting a downward pressure upon the wood in said main hopper, and whereby, when the plunger is elevated to an inoperative position out of the main hopper, the wood contained in the auxiliary hopper will be delivered by gravity into the main hopper to be engaged by the plunger when it is moved downwardly into an operative position.

A further object is to provide an apparatus for defiberizing wood comprising a plurality of abrasive elements each provided with an independent motor, and said motors and their complemental abrasive elements having a universal self-alining mounting whereby all unnecessary strains are eliminated.

Features of the invention reside in the novel means provided for supporting the spider; the arrangement of the main hoppers and the auxiliary hoppers connected therewith and the construction of the plungers which, while forcing the wood pieces downwardly in the main hopper into engagement with the abrasive elements, also retain other wood pieces in the auxiliary hoppers; in the means for operating the plungers; in the universal mountings of the abrasive elements and their driving means; and in the general construction of the apparatus whereby a single attendant stationed upon a platform provided upon the spider may control the operations of the several plungers and cause the wood in the auxiliary hoppers to be delivered into the main hoppers each time one of said main hoppers has been substantially emptied of its contents.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 4 is an enlarged detail sectional view on the line 4—4 of Figures 2 and 3, showing the plunger in a lowered position;

Figure 5 is a sectional plan view on the line 5—5 of Figures 2 and 3;

Figure 1:
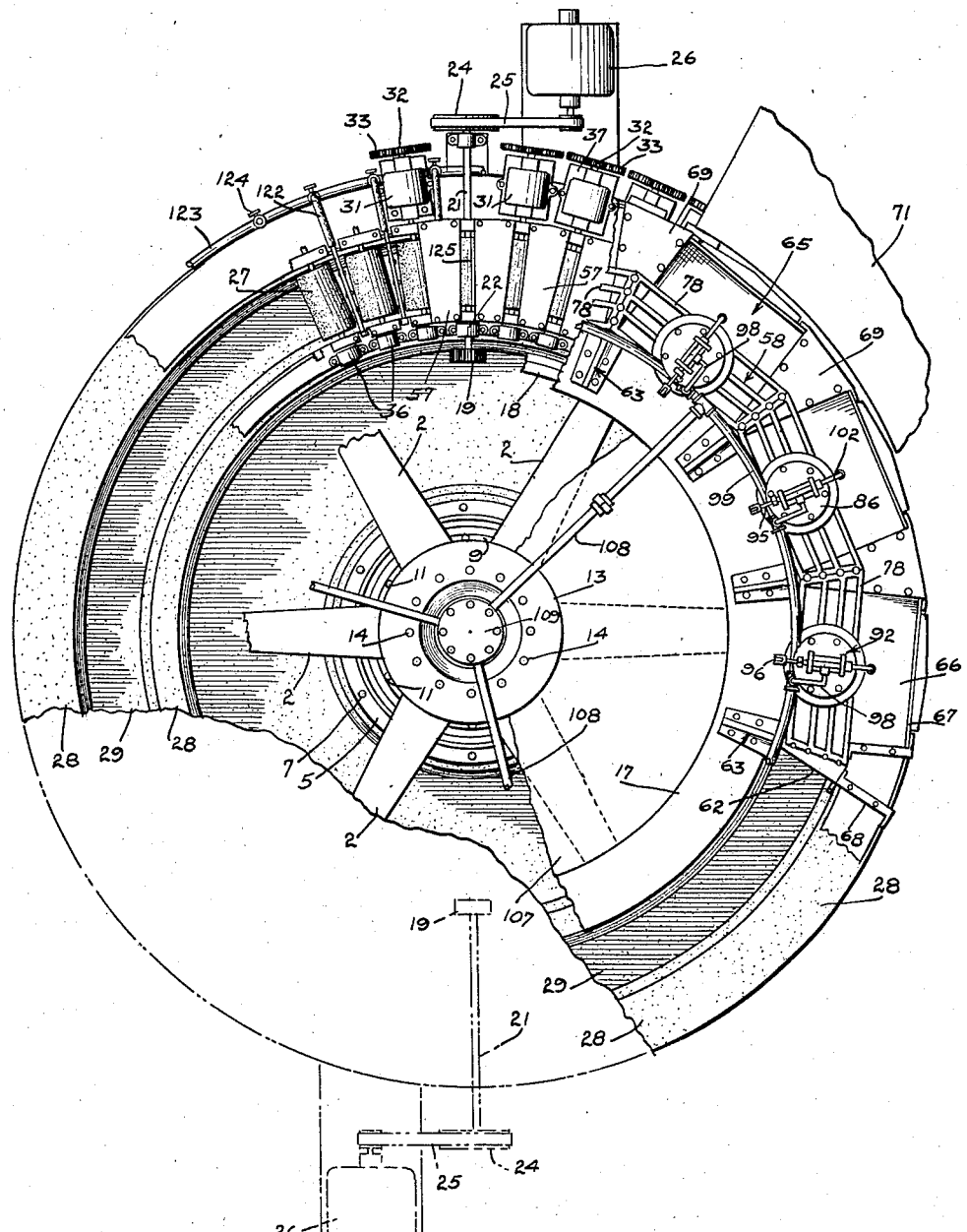
Figure 1 is a plan view of the improved machine.

The novel apparatus featured in this invention for defiberizing wood or separating the fibers thereof, comprises a horizontally disposed spider 2 having a central hub 3 rotatably mounted upon an upright fixed sleeve 4 provided with a lower flange 5 seated upon a suitable foundation 6. The flange 5 is secured to the foundation by suitable anchor bolts 7.

Figure 2:
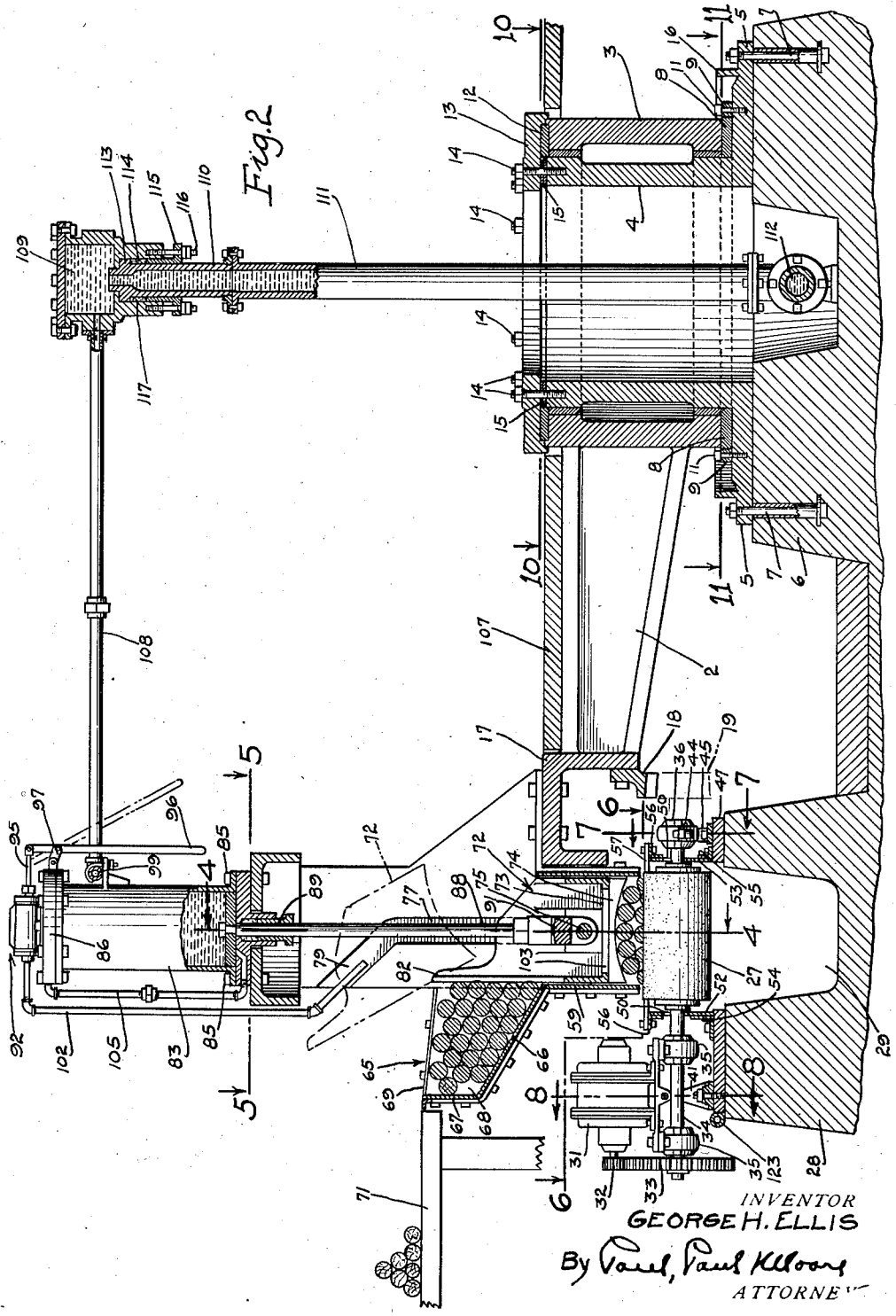
Figure 2 is an enlarged detail sectional view showing the plunger in an operative position in a main hopper, and also showing the connected auxiliary hopper substantially filled with wood.

A plurality of segmental thrust plates 8 are mounted upon the flange 5 adjacent to the sleeve 4, and these plates support the weight of the rotor as will readily be understood by reference to Figure 2. The thrust plates 8 are retained in position by means of a retaining ring 9 secured by bolts 11 to the flange 5. Similar thrust plates 12 are provided at the upper end of the rotor hub 3 and are retained in position by means of a retaining member 13 secured by studs 14 to the upper end of the sleeve 4. Suitable shims 15 are interposed between the upper end of the sleeve 4 and the annular retaining member 13, as shown. When the thrust plates 8 become worn, they may readily be removed by simply unfastening the retaining ring 9 and sliding it upwardly over the lower end of the hub 3, after which the plates 8 may be removed from their seats and others substituted therefor, as will readily be understood by reference to Figure 2. To thus remove the thrust plates 8, it is, of course, necessary to support the weight of the spider upon suitable jacks or other means, not shown in the drawings. The upper thrust plates 12 may likewise be removed for replacement by simply unfastening the retaining member 13.

An annular upstanding web 16 is preferably provided upon the flange 5 to provide means for retaining any lubricant which may leak from the spider bearings. Suitable means, not shown, are provided for lubricating the bearings.

Figure 6:
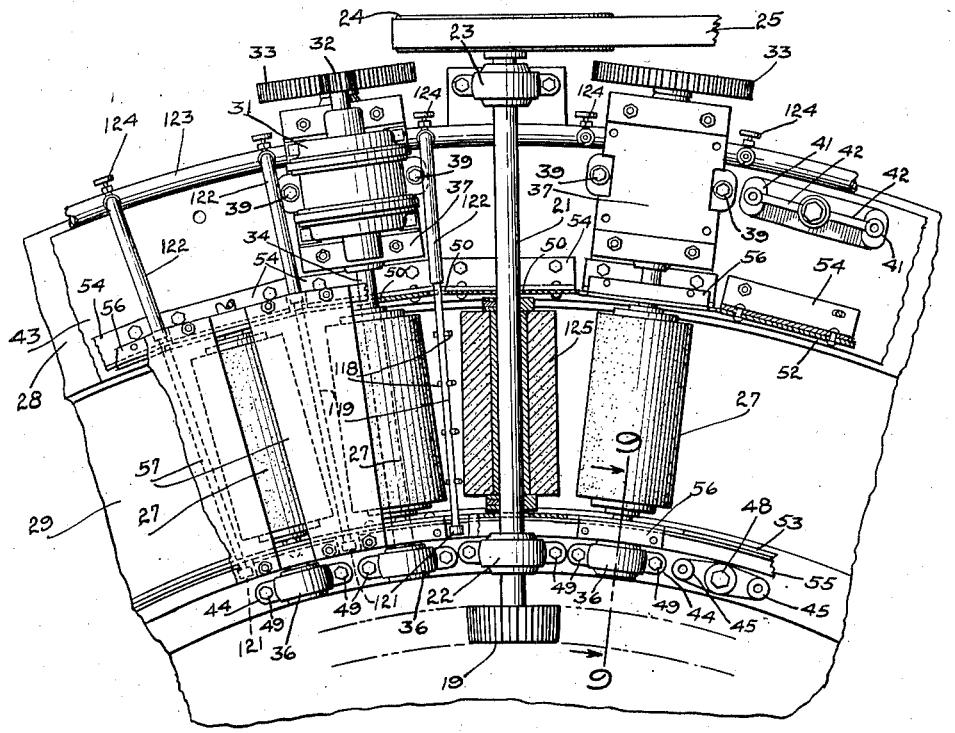
Figure 6 is a sectional detail plan view on the line 6—6 of Figures 2 and 3, showing the means for rotating the spider, hoppers and cylinders.

The spider 2 is shown provided with a channel-shaped rim or felly 17 to the lower portion of which a suitable ring gear 18 is secured. This ring gear meshes with a drive pinion 19 mounted upon a shaft 21 supported in suitable bearings 22 and 23, as shown in Figure 6. A suitable pulley 24 is also secured to the shaft 21 and has a belt 25 connecting it with the pulley of a suitable motor 26, shown in Figure 1.

A series of spaced-apart abrasive elements or grinding wheels 27 are suitably supported upon a foundation 28 having an annular trough or channel 29 provided therein adapted to receive the separated fibers.

Figure 9:
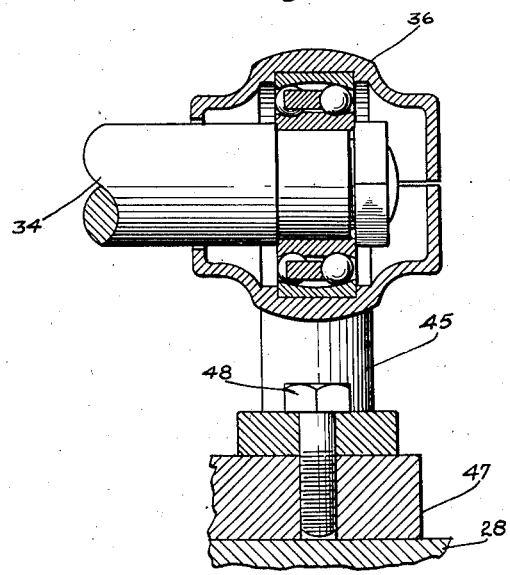
Figure 9 is an enlarged detail sectional view on the line 9—9 of Figure 6.
Figure 8:
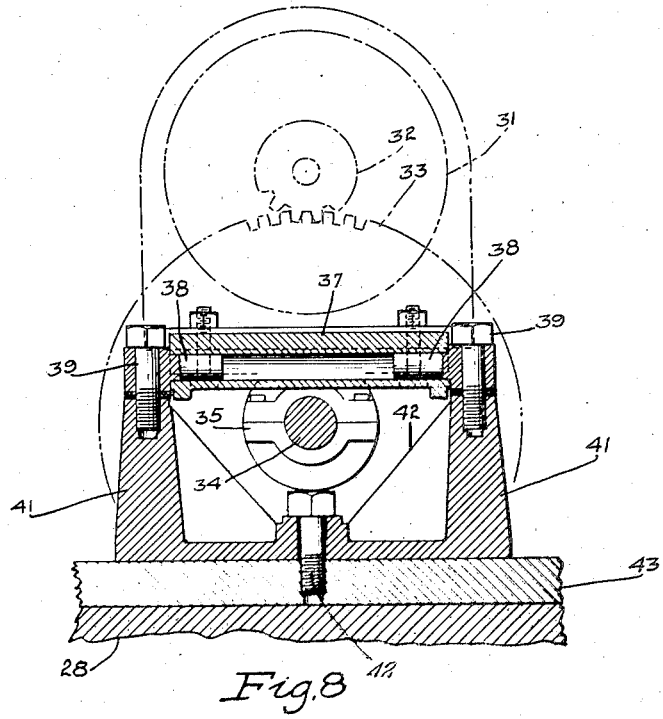
Figure 8 is a detail sectional view on the line 8—8 of Figures 2 and 3, showing the means for supporting the outer ends of the shafts upon which the abrasive elements are mounted.

A feature of this invention resides in the means provided for supporting and operating each abrasive element 27. Each such element is provided with an independent drive and, as these drives are of like construction, but one will be described in detail. Each drive comprises a suitable motor 31 having a drive pinion 32 engaged with a gear 33 terminally secured to a shaft 34, upon which the abrasive element or grinding wheel 27 is secured. The shaft 34 is mounted in suitable anti-friction self-alining bearings 35—35 and 36 of the type illustrated in Figure 9. The bearings 35 are secured to a bed plate 37 to the opposite side of which the motor 31 is secured. The bed plate 37, in turn, is movably supported upon a pair of oppositely disposed trunnions 38 secured by bolts 39 to the upper extremities of a pair of upright posts 41 provided on a bracket 42 adjustably secured by a bolt 42' to a base plate 43 secured to the outer portion of the foundation 28 as best shown in Figure 8.

Figure 3:
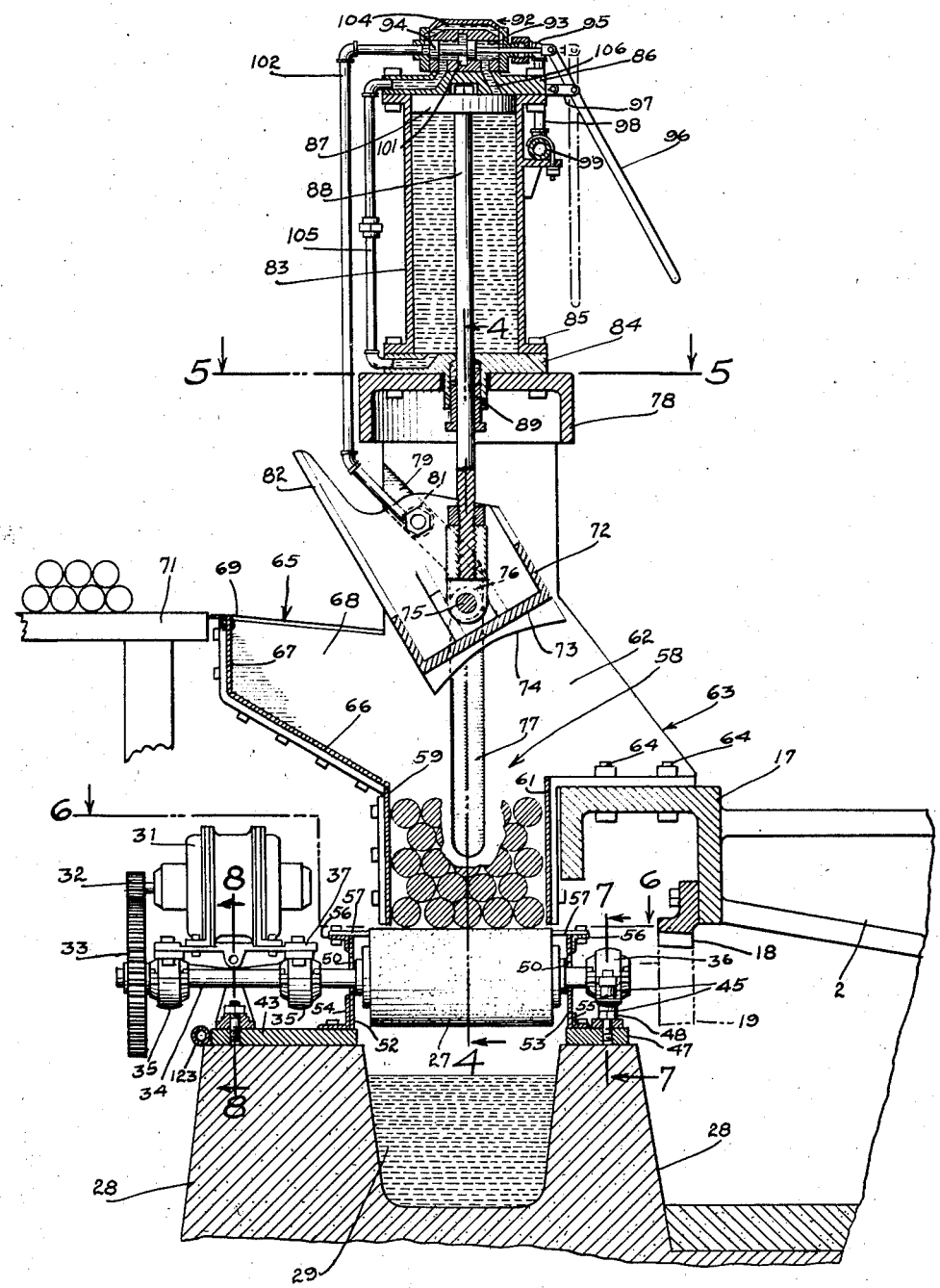
Figure 3 is a detail sectional view showing the plunger in an elevated position, whereby the wood in the auxiliary hopper may discharge into the main hopper.
Figure 7:
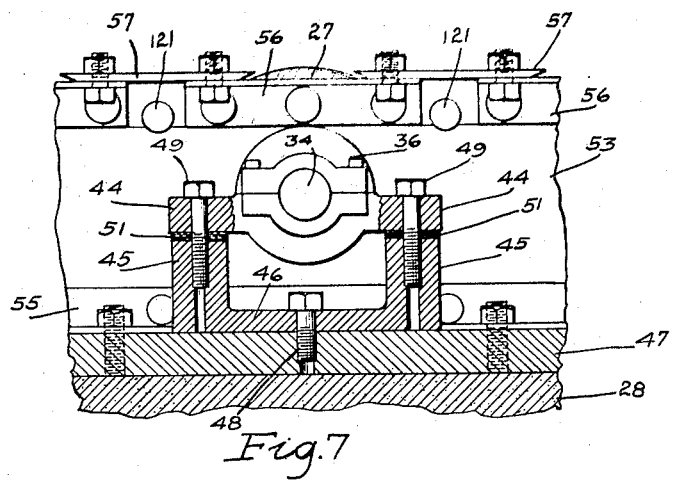
Figure 7 is a detail sectional view on the line 7—7 of Figures 2 and 3, showing the means for adjustably supporting the bearings of the abrasive elements.
Figure 10:
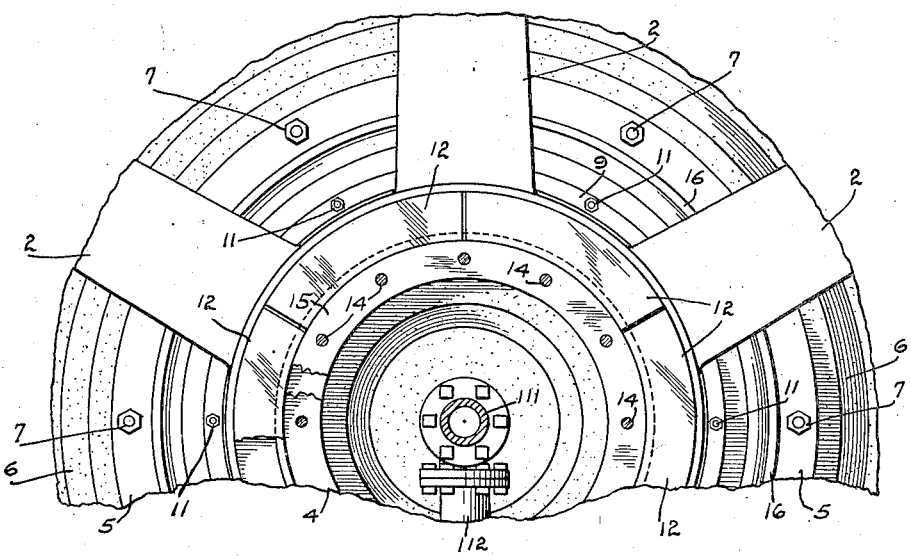
Figure 10 is a detail sectional plan view on the line 10—10 of Figure 2.
Figure 11:
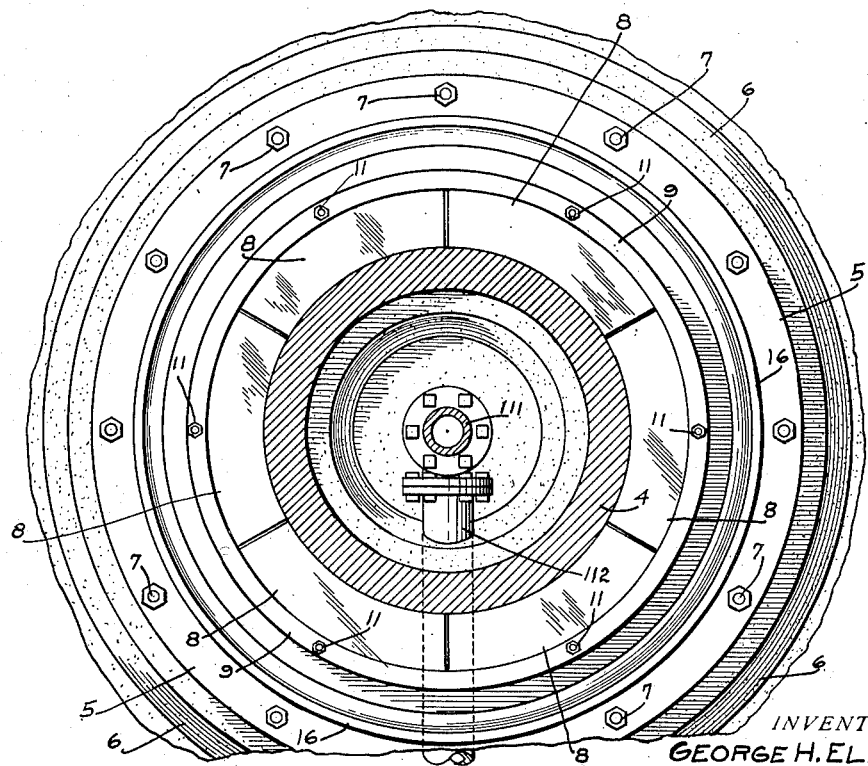
Figure 11 is a detail sectional plan view on the line 11—11 of Figure 2.

The inner bearing 36 of each shaft 34 is shown provided with oppositely projecting extensions 44 seated upon the upstanding portions 45 of a bracket 46 secured to a base plate 47 mounted upon the inner portion of the foundation 28, as shown in Figures 3 and 7. A suitable bolt 48 adjustably secures the bracket 46 to the base plate 47, and the extensions 44 of the bearing 36 are secured to the upright portions 45 of the bracket 46 by suitable bolts 49. Shims 51 are preferably interposed between the portions 44 and 45 whereby the bearing 36 may be vertically adjusted so as to aline the upper portion of the abrasive element with adjacent elements, as will readily be understood by reference to Figure 4.

By thus supporting the abrasive element, the latter may be relatively adjusted with respect to the adjacent elements 27, and the three bearings 35—35 and 36 may also be retained in accurate alinement without difficulty, thereby relieving the parts of unnecessary strains.

Upright plates or walls 52 and 53 are secured to the base plates 43 and 47 by suitable angle irons 54 and 55, respectively. These upright walls are disposed at the ends of the abrasive elements 27 and are provided with suitable apertures 50, through which the shafts 34 pass as best shown in Figure 3. Suitable angles 56 are preferably secured to the upper portions of the walls 52 and 53, and upon these angles and the upper edges of the walls are seated a plurality of horizontally disposed plates 57 which preferably have their upper surfaces situated slightly below the uppermost portions of the peripheries of the abrasive elements 27, as will readily be noted by reference to Figure 4. The opposite edges of each plate 57 is preferably beveled, as shown in Figure 4, so that the edges of the plates may be positioned in close proximity to the peripheries of the abrasive element. The plates 57 and the projecting portions of the peripheries of the elements 27 cooperate to provide a surface over which the wood is moved during the operation of separating the wood fibers. The abrasive elements are preferably arranged to rotate in opposite directions, as indicated by the arrows in Figure 4.

The means for feeding and holding the wood pieces against the peripheries of the abrasive elements 27 is best shown in Figures 2, 3, and 4, and includes a plurality of main hoppers 58, defined by walls 59 and 61, and the adjacent faces 62 of the brackets 63, secured to the rim 17 of the spider in spaced relation by suitable bolts 64. As each hopper and its associated parts are of like construction, but one will be described in detail.

The main hopper 58 has an auxiliary hopper 65 arranged adjacent thereto. This auxiliary hopper is defined by an inclined bottom 66, an upper wall 67, and the end walls 68, the latter being shown integrally formed with the end walls 62 of the main hopper 58, as will readily be understood by reference to Figures 3 and 4. The laterally extending portions of the brackets 63, which constitute the end walls 68 of the auxiliary hoppers 65, preferably have plates 69 secured to their upper edges, as shown in Figures 4 and 5.

A suitable fixed platform 71 is situated adjacent to the line of travel of the auxiliary hoppers 65 adapted to support pieces of wood to be defiberized, as shown in Figures 2 and 3. An attendant or workman stationed upon this platform may fill the auxiliary hoppers as they pass said platform. It is to be understood that the main and auxiliary hoppers, because of being supported upon and secured to the rim 17 of the spider, rotate therewith.

Each main hopper 58 is provided with a ram or plunger 72 having a bottom 73 provided with spaced-apart depending ribs 74 adapted to engage the wood in the main hopper, as shown in Figure 2. The lower edges of the ribs 74 are preferably curved as shown in Figures 2 and 3, so as to prevent the plunger from crowding the wood outwardly against the side walls of the main hopper during the pressure stroke of the plunger.

A shaft 75 is provided at the lower portion of the plunger 72 and preferably has its terminals projecting through the end walls of the plunger and reduced to receive suitable anti-friction rollers 76, mounted to travel in grooved guides 77 provided in the end walls 62 of the main hopper. These end walls 62 extend upwardly as shown in Figures 2, 3, and 4 and are connected together by suitable frame members 78. The grooved guides 77 extend upwardly and have their upper portions 79 inclined outwardly, so that when the plunger 72 is moved upwardly, it will be tilted to the position shown in Figure 3, because of the rollers 81 at the upper portions of the plunger side walls entering the inclined portions 79 of the guide grooves 77. (See Figure 3.) The outer wall of the plunger 72 is provided with upwardly extending portions 82 which function to retain wood pieces in the auxiliary hopper 65, when the plunger is moving downwardly, as shown in Figure 2. When the ram is moved upwardly to the position shown in dotted lines in Figure 2 and full lines in Figure 3, the wood contained in the auxiliary hopper 65 will drop by gravity into the main hopper 58, as shown in Figure 3, whereupon the plunger may be moved downwardly into engagement with the wood pieces contained in the main hopper and the auxiliary hopper supplied with fresh wood.

The means provided for operating the plunger 72 is here shown as being of a hydraulic nature, and comprises a cylinder 83 having a bottom head 84 secured thereto. This head, in turn, is secured to the cross frame member 78, connecting together the upper portions of the brackets 63. The cylinder 83, head 84, and frame member 78 may be connected together by suitable bolts 85, as shown in Figure 4. The upper end of the cylinder 83 is provided with a suitable head 86.

A piston 87 is movably mounted within the cylinder 83 and has a piston rod 88 passing through a suitable leak-proof bearing 89 provided in the head 84, as shown in Figure 3. The lower end of the piston rod is shown provided with a yoke 91 operatively connected with the shaft 75 so that when the piston is actuated, the plunger 72 also will be operated.

A means for controlling the flow of fluid between opposite ends of the cylinder 88 is shown in Figure 3, and comprises a suitable control valve 92 having a chamber 93 in which is mounted a slide 94. This slide has a stem 95 protruding from one end of the valve housing and is connected with a control lever 96 having a link 97 operatively connecting it with the head 86 at the upper end of the cylinder. A pipe 98 connects the valve 92 with a supply pipe 99 suitably supported upon the cylinder 83 as shown in Figures 2 and 3. A centrally disposed annular chamber 101 is provided in the valve casing which communicates with the pipe 98 leading to the supply pipe 99. The control valve 92 also has a discharge pipe 102, the lower end of which is positioned to discharge into the hollow plunger 72. The water delivered into the plunger from the discharge pipe 102 may flow therefrom through suitable apertures 103 provided in the bottom of the plunger into contact with the wood positioned thereunder, as will be understood by reference to Figure 2.

The discharge pipe 102 is connected with a duct 104 communicating with each end of the chamber 93 of the valve. In Figure 3, the slide 94 is shown positioned to permit the pressure fluid entering the centrally disposed chamber 101 to flow therefrom through a by-pass 105 into the lower portion of the cylinder beneath the piston 87, causing the piston to rise to the position shown in Figure 3. When the slide 94 is thus positioned, the upper end of the cylinder above the piston will be discharging through a duct 106 into the valve chamber 93, at the right hand side of the valve. From the chamber 93, it will flow through the duct 104 into the discharge pipe 102 and subsequently into the plunger 72, as will readily be understood. When the control lever 96 is positioned, as indicated in dotted lines in Figure 3, the pressure fluid will be delivered into the upper portion of the cylinder above the piston, whereupon the latter will be forced downwardly and the liquid or fluid beneath the piston will flow through the by-pass 105 back to the valve chamber 93 to the left hand side of the valve, when viewed as shown in Figure 3, from whence it will be discharged through the pipe 102 into the plunger.

It will therefore be seen that each plunger is provided with an independent operating mechanism capable of independent control by an attendant or operator stationed upon a platform 107 supported upon the arms of the spider. (See Figures 1 and 2.)

The means for delivering the pressure fluid to the supply pipe 99 is shown consisting of two or more radially disposed pipes 108 each communicating at one end with the supply pipe 99 and at their opposite ends with a head 109, rotatably mounted upon a connection 110 terminally mounted upon the upper end of a stand pipe 111. The stand pipe 111 is connected at its lower end with a pipe 112 leading to a suitable source of supply, not shown. The connection 110 is provided at its upper end with an annular flange 113 received in a bore 114 provided in the distributing head 109, as shown in Figure 2. A gland 115 is secured by studs 116 to the lower portion of the distributing head 109 and is adapted to compress a packing 117 against the annular flange 113 within the bore 114 to provide a leak-proof connection between the distributing head 109 and the connection 110.

Means are provided for hydrating those portions of the wood contacting directly with the abrasive elements so as to moisten the fibers sufficiently to permit them to be separated substantially without tearing. Such a means is shown in Figures 4 and 6, and may consist of a plurality of small spray nozzles 118 provided upon pipes 119 interposed between the abrasive elements. The pipes 119 are suitably supported in the upper portions of the plates or wall members 52 and 53 and are secured thereto by suitable means, not shown. The nozzles are preferably disposed as shown in Figure 4, so that the spray of water projected therefrom against the peripheries of the abrasive elements 27 will be in a direction coincident with the direction of movement of the peripheries of said abrasive elements. It will thus be seen that alternate sets of nozzles will be projecting sprays of water upwardly against the peripheries of adjacent abrasive elements while the remaining sets of nozzles will project sprays of water downwardly against the peripheries of adjacent abrasive elements. The nozzles 118 thus provide means for hydrating the wood during the process of separating the fibers, and also for removing the separated fibers from the peripheries of the abrasive elements and delivering them into the annular trough or channel 29 provided directly beneath the abrasive elements. The abrasive elements, as hereinbefore stated, preferably operate in opposite directions as indicated by the arrows in Figure 4.

The inner end of each pipe 119 is closed by a suitable cap 121 and the opposite ends of these pipes are connected by suitable connections 122 to a main supply pipe 123 having a connection with a suitable source of supply, not shown. Valves 124 provide means for controlling the flow of water to the nozzle pipes 119.

In the drawings, I have shown an abrasive element 125 mounted upon the drive shaft 21. This element 125 may be secured to the shaft 21 so as to impart a grinding action to the wood as the latter is moved over the abrasive elements.

Operation

In the operation of the machine, the spider is rotated by the motor 26, whereby the main hoppers 58 will travel over the abrasive elements 27, carrying with them the wood that is supported therein, as shown in Figures 2 and 3. The cylinders 83, and associated parts, being mounted upon the upper portions of the brackets 63, rotate with the main hoppers, as do also the auxiliary hoppers 65. The attendant or operator stationed on the inner platform 107 watches the main hoppers 63, and when a plunger reaches the bottom of its downward stroke, he will actuate the control lever 96, controlling the operation of that particular plunger, whereupon said plunger will be returned to the full line position shown in Figure 3, and allow the wood contained in the associated auxiliary hopper to be fed by gravity into the empty main hopper. The operator will then move the operating lever 96 to the dotted line position in Figure 3, whereupon the pressure fluid will act upon the upper end of the piston and move the plunger downwardly into engagement with the wood positioned in said main hopper.

As the auxiliary hoppers pass the platform 71, partially shown in Figures 1, 2, and 3, a workman stationed on the platform will refill said hoppers 65, as shown in Figure 2, after which the operator on the platform 107 may manipulate the control levers 96 and cause the wood in the auxiliary hoppers to be delivered into the main hoppers, as the latter are emptied. The separated fibers will be discharged into the annular trough 29 provided beneath the abrasive elements from which they are removed by suitable means, not shown.

From the foregoing, it will be noted that the operation of this novel machine is very simple and only two operators are required, one to control the operation of the plungers and the other to keep the auxiliary hoppers 65 supplied with wood. The novel mounting of each abrasive element and its driving means is also important in that it provides means whereby the bearings supporting the shafts of the abrasive elements may be accurately alined and retained in such alinement. Each abrasive element unit, including the element and its driving means, is vertically adjustable relatively to the adjacent abrasive elements so that the effective contact points of the abrasive elements, which project above the horizontally disposed plates 57 may, as shown in Figures 4 and 7, be horizontally alined whereby maximum efficiency is obtained.

The operation and construction of the plunger 72 is also of importance in that the plungers, in addition to providing means for forcing the wood into engagement with the abrasive elements, also provide means for temporarily retaining the wood in the auxiliary hoppers during the time that the plungers 72 are in their lower operative positions. The inclined portions 79 of the guide grooves 77 cause the plungers to be tilted to the dotted line position shown in Figure 2, and full line position shown in Figure 3, when the plungers reach their uppermost positions, thereby providing ample clearance for an operator standing on the platform 71 to view the interiors of the main hoppers, as they pass.

I claim as my invention:

1. In an apparatus for defiberizing wood, a plurality of abrasive elements mounted for rotary movement, a main hopper mounted for movement over said abrasive elements and adapted to receive wood to be defiberized, a plunger adapted to feed the wood in said main hopper into engagement with the peripheries of said abrasive elements, means for guiding the plunger in its up and down movements, an auxiliary hopper connected with said main hopper, means on the plunger adapted to cause the wood in said auxiliary hopper to be retained therein upon downward movement of the plunger, and said plunger guide means being adapted to tilt the plunger when the latter is moved to a position above said main hopper, whereby the wood in said auxiliary hopper may be delivered into said main hopper.

2. In an apparatus for defiberizing wood, a spider mounted for rotary movement and having a plurality of hoppers mounted thereon and disposed in upright positions, a series of abrasive elements rotatably mounted beneath said hoppers in the line of travel thereof, a plunger for each hopper adapted to force the wood in said hoppers into frictional engagement with the peripheries of said abrasive elements, independent operating means for said plungers and means for tilting each plunger upon upward movement thereof to permit fresh supplies of wood to be delivered into said hoppers.

3. In an apparatus for defiberizing wood, a spider mounted for rotary movement and having a plurality of main hoppers mounted thereon and disposed in upright positions, a series of abrasive elements rotatably mounted beneath said hoppers in the line of travel thereof, a plunger for each main hopper adapted to force the wood in said hoppers into frictional engagement with the peripheries of said abrasive elements, an auxiliary hopper connected with each main hopper, and cam means for tilting each plunger as it is moved upwardly, thereby to cause the wood supported in the auxiliary hopper associated directly therewith, to be discharged into its complemental main hopper.

4. In an apparatus for defiberizing wood, a horizontally disposed spider, a plurality of rotary abrasive elements mounted adjacent the periphery of said spider, means on the spider adapted to receive the wood and convey it over the peripheries of said abrasive elements whereby the fibers are separated, said means receiving the wood being coextensive with a group of abrasive elements, an independent drive for each abrasive element, and each abrasive element and its respective driving means being assembled as a unit, which units are adapted for independent adjustment.

5. In an apparatus for defiberizing wood, a spider mounted for rotary movement, a plurality of abrasive elements at the periphery of the spider and supported independently thereof, a plurality of hoppers supported on the spider over said elements and adapted to receive pieces of wood, a plunger associated with each hopper for pressing the wood into frictional engagement with said elements as the spider is rotated, a cylinder and piston for operating each plunger, a stand pipe fixedly mounted within the hub of the spider, and a distributing head rotatably supported on said stand pipe and connected with said cylinders for supplying pressure fluid thereto.

6. In an apparatus for defiberizing wood, abrasive elements mounted for rotary movement, a hopper to receive the wood and adapted to move over said abrasive elements, a plunger associated with the hopper for forcing the wood into frictional engagement with the peripheries of the abrasive elements, means for operating said plunger, means carried by the plunger for dividing the hopper into two chambers, and means for tilting the plunger on its upward movement to permit fresh supplies of wood to be delivered from one chamber into the other chamber of said hopper.

7. In an apparatus for defiberizing wood, a spider mounted for rotary movement and having a plurality of main hoppers mounted thereon, a series of abrasive elements rotatably mounted beneath said hoppers in the line of travel thereof, a plunger for each main hopper adapted to force the wood in said hopper into frictional engagement with the peripheries of said abrasive elements, means for operating said plungers, an auxiliary hopper associated with each main hopper, said plungers each forming a wall for its respective auxiliary hopper, and means for tilting said plungers as they move upwardly to cause the wood supported in the auxiliary hoppers to be discharged into their respective main hoppers.

8. In an apparatus for defiberizing wood, a hopper to receive the wood, abrasive elements mounted for rotary movement beneath said hopper, a plunger associated with the hopper and adapted to force the wood into frictional engagement with the peripheries of the abrasive elements, means for operating said plunger, and means for tilting the plunger on its upward movement to clear said operating means and to permit fresh supplies of wood to be delivered into said hopper.

9. In an apparatus for defiberizing wood, a plurality of abrasive elements mounted for rotary movement, a main hopper mounted for movement over said abrasive elements and adapted to receive wood to be defiberized, a plunger adapted to feed the wood in said main hopper into engagement with the peripheries of the abrasive elements, means for operating said plunger, an auxiliary hopper connected with said main hopper, means on the plunger adapted to cause the wood in the auxiliary hopper to be retained therein upon the downward movement of the plunger, means whereby the plunger is tilted when it is moved to a position above said main hopper and the wood in the auxiliary hopper may be delivered into said main hopper.

10. In an apparatus for defiberizing wood, a plurality of abrasive elements mounted for rotary movement, a spider mounted for rotary movement and having a plurality of hoppers mounted thereon and disposed substantially perpendicular to the longitudinal axes of the abrasive elements, plungers adapted to force the wood in said hoppers into frictional engagement with the peripheries of said elements, independent operating means for said plungers, and means for tilting the plungers upon upward movement thereof to clear said operating means and to permit fresh supplies of wood to be delivered into the hoppers.

11. In an apparatus for defiberizing wood, a hopper to receive the wood, an abrasive element mounted for rotary movement beneath the hopper, a plunger associated with the hopper for forcing the wood into frictional engagement with the abrasive element, means for operating said plunger, and means for tilting the plunger on its upward movement to clear said operating means and to permit fresh supplies of wood to be delivered into said hopper, said abrasive element being universally adjustable with respect to said hopper.

12. In an apparatus for defiberizing wood, a spider mounted for rotary movement and having a plurality of main hoppers mounted thereon, a series of abrasive elements rotatably mounted beneath said hoppers in the line of travel thereof and over the peripheries of which the wood contained in the hoppers moves in a direction lengthwise of its fibers, a plunger for each hopper adapted to force the wood in said hoppers into frictional engagement with the peripheries of said abrasive elements, means for operating said plungers, means for tilting the plungers on their upward movement, an auxiliary hopper connected with each main hopper, and means associated with the plunger and dividing the two hoppers and made operable by the upward movement of said plunger to thereby establish communication between said hoppers and permit the fresh supplies of wood in said auxiliary hoppers to discharge into said main hoppers.

GEORGE H. ELLIS.